US008843993B2

(12) United States Patent
Bialik et al.

(10) Patent No.: US 8,843,993 B2
(45) Date of Patent: Sep. 23, 2014

(54) NATURAL LANGUAGE PROCESSING INTERFACE FOR NETWORK SECURITY ADMINISTRATION

(71) Applicant: Check Point Software Technologies Ltd., Tel Aviv (IL)

(72) Inventors: Uri Bialik, Ramat Efal (IL); Rami Ben-Ami, Kiryat-Ono (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 0 days.

(21) Appl. No.: 13/706,369

(22) Filed: Dec. 6, 2012

(65) Prior Publication Data

US 2014/0165127 A1     Jun. 12, 2014

(51) Int. Cl.
*G06F 17/28*    (2006.01)
*H04L 29/06*   (2006.01)

(52) U.S. Cl.
CPC ..................................... *H04L 63/20* (2013.01)
USPC ................................... 726/1; 706/11; 706/14

(58) Field of Classification Search
USPC ........................................... 726/1; 706/11, 14
See application file for complete search history.

(56) References Cited

U.S. PATENT DOCUMENTS

| 2006/0015728 A1* | 1/2006 | Ballinger et al. | 713/172 |
| 2007/0208764 A1* | 9/2007 | Grisinger | 707/100 |
| 2012/0079107 A1* | 3/2012 | Williams et al. | 709/224 |

* cited by examiner

*Primary Examiner* — Jung Kim
*Assistant Examiner* — Ayoub Alata
(74) *Attorney, Agent, or Firm* — Mark M. Friedman

(57) ABSTRACT

To administer computer network security, a computer system receives a bit string that encodes a natural-language request for adjusting a security policy of the network and parses the bit string to identify one or more objects and an action to be applied to the object(s). Preferably, the system displays a description of one of the objects and a menu of operations that are applicable to the object, receives a user selection of one of the options, and effects the selected operation. The scope of the invention also includes a non-transient computer-readable storage medium bearing code for implementing the method and a system for implementing the method.

16 Claims, 3 Drawing Sheets

NATURAL LANGUAGE PROCESSING INTERFACE FOR NETWORK SECURITY ADMINISTRATION

FIELD AND BACKGROUND OF THE INVENTION

The present invention relates to network security administration and, more particularly, to an interface that uses natural language understanding to assist a network security administrator in handling requests for adjusting the security policy of a computer network.

Network security configuration software is used extensively by network security administrators for implementing network security policies. There are many implementations of such software, but all of them share the following features:

- The user (the network security administrator) defines network security policy elements (security policy building blocks) such as server names, network names, network user names, security rules, network services and IP addresses. Such network security policy elements are called "objects" herein.
- The software presents the user a set of one or more fields to fill in, in the form of a form, a graphical user interface dialog, or one or more command lines. To create a valid object, the user must fill in the field(s).
- Some forms of the software help the user to achieve a task that includes multiple objects or steps by using "wizards" that guide the user through all the necessary configuration steps.

One example of such a prior art software package that uses a graphical user interface is Smart Dashboard™, available from Check Point Software Technologies Ltd. of Tel Aviv, Israel.

These software packages do not extract configuration elements from natural language text and do not attempt to guess what the user would like to do with the objects that are named in such text, actions such as looking for existing system security configuration elements that include a certain IP address or creating a new system security configuration element that includes a certain IP address.

The present invention is a novel application of the well-known technology of natural language understanding. As evidenced by the appearance of the phrase "natural language understanding" in the titles of the following 29 published US patent applications:

US 2011/0179032
US 2010/0151889
US 2010/0042404
US 2009/0259459
US 2008/0312905
US 2008/0310718
US 2008/0208586
US 2008/0154581
US 2008/0109210
US 2007/0225969
US 2007/0156392
US 2007/0143099
US 2007/0129936
US 2007/0112556
US 2007/0112555
US 2007/0033004
US 2006/0074631
US 2005/0096913
US 2005/0049874
US 2004/0220809
US 2004/0220797
US 2004/0111253
US 2004/0030557
US 2003/0212544
US 2003/0212543
US 2003/0055623
US 2002/0196679
US 2002/0103837
US 2002/0042711 natural language understanding is a well-developed field, so that there is no need to present herein any details of that field. All of these patent applications are incorporated by reference for all purposes as if fully set forth herein. The object(s) could be (an) IP address(es), (a) server name(s), (a) network user name(s) and/or (a) network service(s).

SUMMARY OF THE INVENTION

According to the present invention there is provided a method of network security administration including the steps of: by a computer system: (a) receiving a bit string that encodes a natural-language request for adjusting a security policy of a computer network; and (b) parsing the bit string to identify: (i) at least one object, and (ii) an action to be applied to the at least one object.

According to the present invention there is provided a non-transient computer-readable storage medium having computer-readable code embodied on the computer-readable storage medium, the computer-readable code for adjusting a security policy of a computer network, the computer-readable code including: (a) program code for parsing a bit string that encodes a natural-language request for adjusting the security policy, to identify: (i) at least one object, and (ii) an action to be applied to the at least one object.

According to the present invention there is provided a system for network security administration, including: (a) a non-volatile memory wherein is stored program code for parsing a bit string that encodes a natural-language request for adjusting a security policy of a computer network, to identify: (i) at least one object, and (ii) an action to be applied to the at least one object; and (b) a processor for executing the program code.

In the most basic method of the present invention, a computer system receives a bit string that encodes (for example using ASCII encoding) a natural-language request for adjusting a security policy of a computer network, and parses the bit string to identify one or more objects and one or more actions to be applied to the object(s).

Preferably, the system also displays a description of (one of) the object(s). The description of the object could be a synonym of the object (exact match), a genus (generic description) of the object (partial match), or an indication that the object is unknown.

More preferably, the system also displays a menu of one or more operations that are applicable to the object. Examples of such operations include:

if the object is unknown: defining the object as a new object;

if the object is known (exact or partial match): finding one or more existing objects that are similar to the object, checking a current security policy that is now being applied to the object, adding the object to an existing security rule, creating a new security rule for the object, and modifying the object.

Most preferably, the system also displays the request (in natural-language form) and the menu is displayed (for example, as a drop-down menu) in association with a portion of the display of the request that includes a natural-language representation of the object.

Also most preferably, if the user decides that (one of) the operation(s) should be implemented, the system also receives a user selection of that operation and effects the selected operation.

Also more preferably, the system also displays the request together with the description of the object. The description of the object is displayed in association with a portion of the display of the request that includes a natural-language representation of the object.

A non-transient computer-readable storage medium of the present invention has embodied thereon computer-readable code for adjusting a security policy of a computer network. As a bare minimum, the computer-readable code includes program code for parsing a bit string that encodes (for example, using ASCII encoding) a natural-language request for adjusting the security policy. The parsing identifies one or more objects and (an) action(s) to be applied to the object(s).

Preferably, the computer-readable code also includes program code (e.g. code of a graphical user interface) for displaying the request. More preferably, the computer-readable code also includes program code (e.g. code of a graphical user interface) for displaying a respective description of each object. Also preferably, the computer-readable code also includes program code (e.g. code of a graphical user interface) for, for each object, displaying a respective menu of one or more operations that is/are applicable to the object. Still more preferably, the computer-readable code also includes program code (e.g. code of a graphical user interface) for, for each object, receiving a user selection of an operation from the menu. Most preferably, the computer-readable code also includes program code for effecting the selected operation.

The scope of the invention also includes a network security system that includes a memory wherein is stored program code of the invention and a processor for executing the program code.

BRIEF DESCRIPTION OF THE DRAWINGS

Various embodiments are herein described, by way of example only, with reference to the accompanying drawings, wherein:

FIGS. 2-5 are screen shots of an exemplary network security administration session.

DESCRIPTION OF THE PREFERRED EMBODIMENTS

Figure 1:
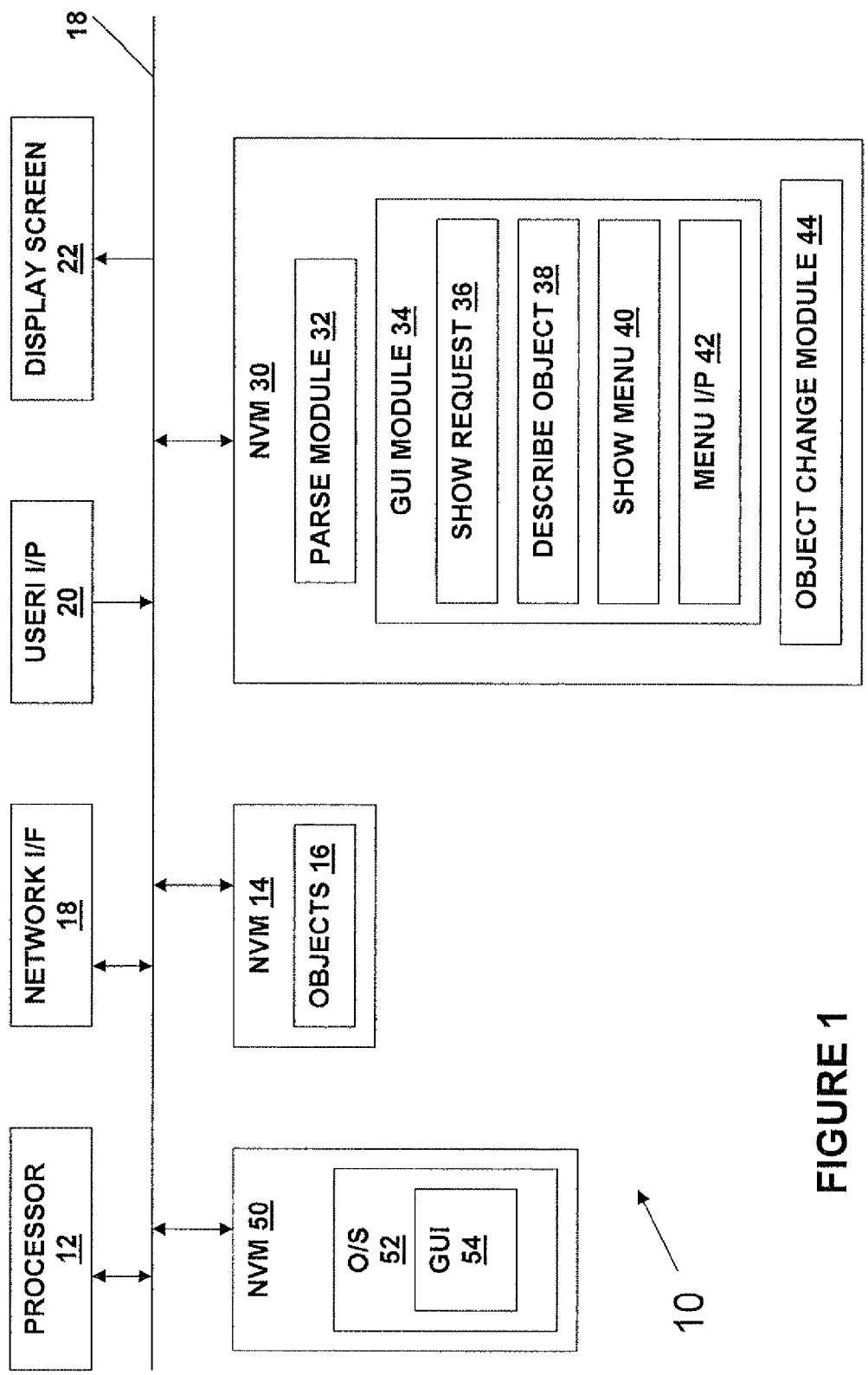
FIG. 1 is a partial high-level block diagram of a system of the present invention.

The principles and operation of a natural language interface for network security administration according to the present invention may be better understood with reference to the drawings and the accompanying description.

Referring now to the drawings, FIG. 1 is a partial high-level block diagram of a system 10 for managing network security according to the present invention. System 10 includes, inter alia, a processor 12, an interface 18 to the network being managed, standard user input devices 20 such as a keyboard and a mouse, a display screen 22, and three nonvolatile memories 14, 30 and 50, all communicating with each other via a bus 24. FIG. 1 is a partial diagram in the sense that only components of system 10 that are needed to explain the operation of the present invention are illustrated.

In nonvolatile memory 50 is stored the code of an operating system 52. Processor 12 executes the code of operating system 52 to operate system 10. The code of operating system 52 includes code of a graphical user interface (GUI) 54 for managing interactive displays on display screen 22, with user input to the interaction being via user input devices 20. Nonvolatile memory 14 is used to store network security objects 16. Nonvolatile memory 30 is used to store code of the present invention, for creating and modifying objects 16, that also is executed by processor 12. The code stored in nonvolatile memory includes modules 32, 34 and 44 as described below. Nonvolatile memory 14 is a read/write memory such as a hard disk or a flash disk. Normally, nonvolatile memories 30 and 50 also are read/write memories, but alternatively nonvolatile memories 30 and 50 could be read-only memories. Although nonvolatile memories 30 and 50 are shown as separate memories in FIG. 1, nonvolatile memories 30 and 50 could be a single common memory device for storing both operating system 52 and modules 32, 34 and 44. Nonvolatile memory 30 is an example of a computer-readable storage medium bearing computer-readable code for implementing the present invention. Other examples of such media include CDs and DVDs.

The user of system 16 is a network security administrator. S/he continually receives, from users of the network, requests for adjusting the network security policy. For example, the requests could list servers in the network or users of the network that should be granted or denied access to certain network resources and services. The requests are in the form of natural language text. In a conventional network security system, the network security administrator needs to translate the natural language text into objects that the network security system understands. The purpose of the present invention is to make this task simpler and less error-prone.

For this purpose, three modules are provided in nonvolatile memory 30: a parse code module 32, a GUI code module 34 and an object creation and modification module 44. GUI code module 34 cooperates with GUI code 54 to facilitate the user's use of the other two modules. An example of this facilitation is presented below.

GUI code module 34 includes code that, when executed by processor 12, enables the user to paste, or drag and drop, natural language text (received e.g. by e-mail, in a document or in a Web page) into display screen 22. The code of parse code module 32 is executed by processor 12 to apply linguistic and context analysis techniques of natural language understanding to extract information from the text, including the objects referenced explicitly or implicitly in the text and requested actions related to those objects, that can be used to define a network security policy. Then, if the user agrees to the requested changes in the network security policy, the user interacts with display screen 22 (via execution of the code of GUI code module 34 by processor 12) to implement the requested changes via execution of the code of object creation and modification module 44 by processor 12. The actions that the user can invoke via display screen 22 are the actions of conventional network security management software, and include, inter alia, defining a new object, finding existing objects that are similar to an object referenced in the text (for example, if the object is a server name, "similar" objects are other server names; if the object is an IP address that represents a server, "similar" objects could be network objects that contain this IP address; if the object is a service name such as "http", "similar" objects could be objects whose names include the string "http", for example "https"), checking the current security policy for an object referenced in the text, adding an object referenced in the text to an existing rule, creating a new object (for example, a new rule that includes an object referenced in the text), and modifying an existing object. When a new object is created, the object type (network, server, network user identity, etc.) is determined automatically. The action options presented to the user on display screen 22 include action options that were identified by the execution of the code of parser code module 32 in the text.

The following example illustrates how the user interacts with display screen 22.

The user receives the following e-mail:

---
Dear administrator,
Please allow our new web server (IP 172.16.2.17) to communicate with our mail server (IP 172.16.2.2) using TCP port 25.
Thanks!

---

Figures 2, 3:
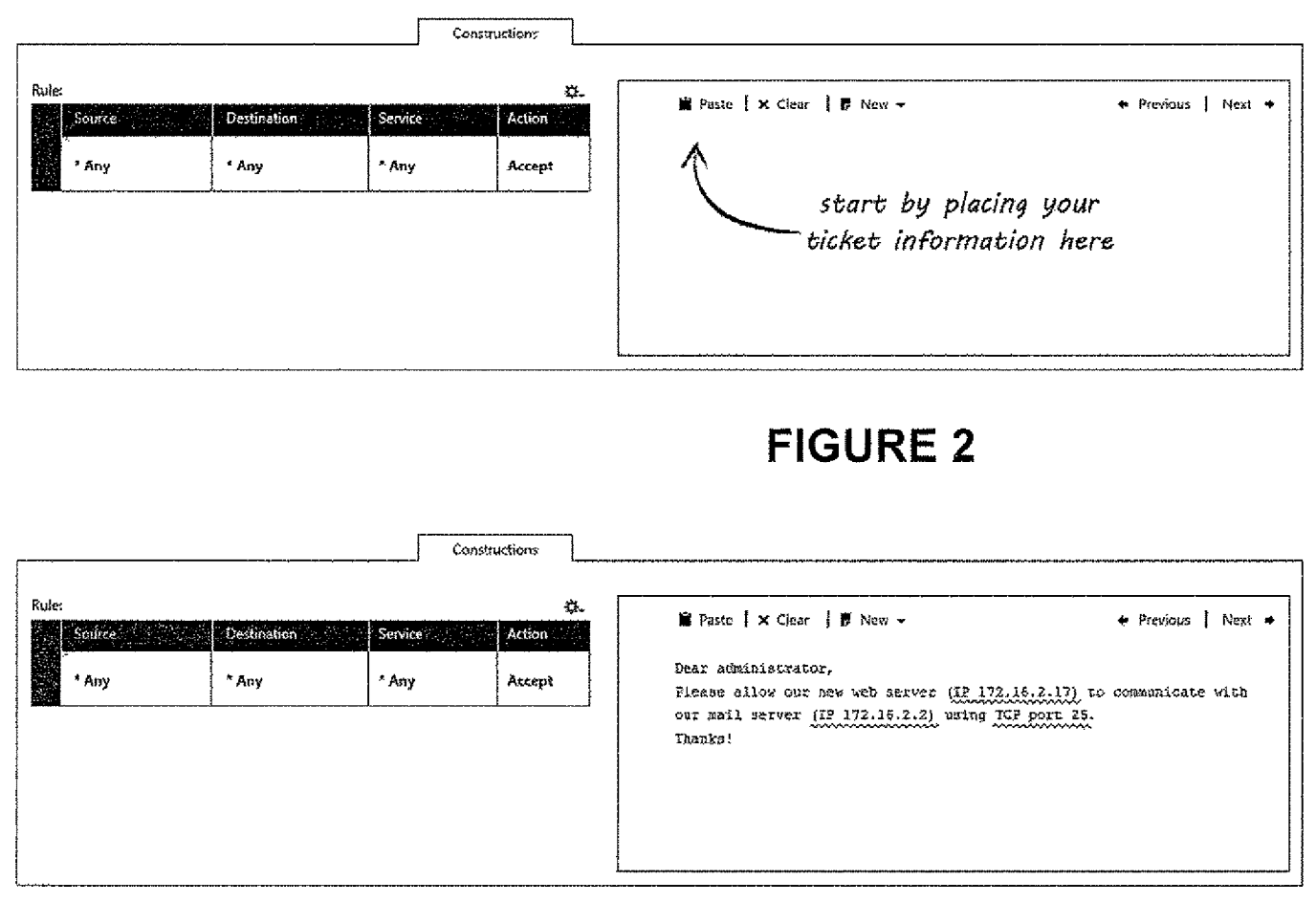

FIG. 2 is a screen shot of display screen 22 ready to receive the text of this e-mail, for example by drag and drop or by cut and paste. Note that what processor 12 actually receives to process by executing the code of parse code module 32 is a bit string that encodes this text, for example using ASCII encoding.

Figures 4, 5:
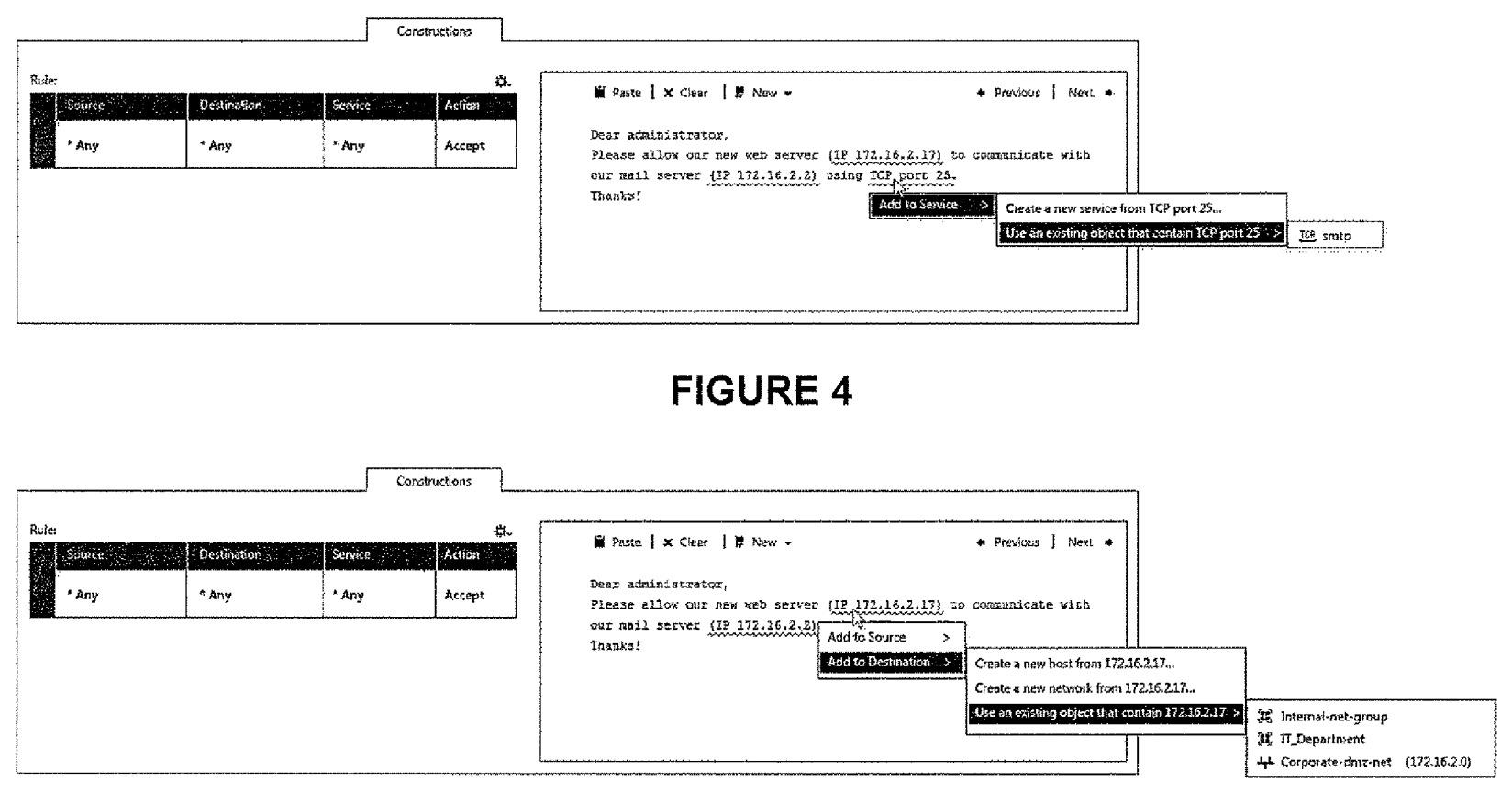

FIG. 3 is a screen shot of display screen 22 after the text of the e-mail has been made available for parsing and has been parsed. Networking elements in the text are underlined with wavy lines. Clicking on one of the highlighted elements invokes a display of related existing objects. In the current example, system 10 finds exact matches of TCP port 25 (which is an example of a "network service" object) and IP address 172.16.2.2 and a partial match of IP address 172.16.2.17. As illustrated in FIG. 4, TCP port 25 is represented by a TCP service object called "SMTP". IP address 172.16.2.2 would be represented by an existing server object called "mail_server". As illustrated in FIG. 5, IP address 172.16.2.17 is part of an existing network called "Corporate-dmz-net" that covers all IP addresses between 172.16.2.0 and 172.16.2.255.

GUI code module 34 includes sub-modules for supporting the kinds of user interactions illustrated in FIGS. 2-5: a "show request" sub-module 36 with code for displaying the text of the request, a "describe object" sub-module 38 with code for highlighting the objects found by parse code module 32 in the text and for displaying descriptions of those objects, a "show menu" sub-module 40 with code for displaying drop-down menus of user options such as are shown in. FIGS. 4 and 5, and a "menu i/p" module 42 with code for receiving user selections of items in the drop-down menus.

System 10 as described above is a software-based embodiment of the present invention. As is known in the art, alternatively a system of the present invention could be implemented in hardware, in firmware, or in any suitable combination of software, firmware and hardware.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method of network security administration comprising the steps of:
    (a) receiving, by a computer system, a bit string that encodes a natural-language request for adjusting a security policy of a computer network;
    (b) parsing, by said computer system, said bit string to identify:
        (i) at least one object, and
        (ii) an action to be applied to said at least one object;
    (c) said computer system, in response to said identifying of said at least one object, displaying a description of one of said at least one object:
    (d) displaying, by said computer system, a menu of at least one operation that is applicable to said at least one object; and,
    (e) displaying, by said computer system, said natural-language request; and wherein said menu is displayed in association with a portion of said display of said natural-language request that includes a natural-language representation of said at least one object.

2. The method of claim 1, wherein said at least one object is selected from a group consisting of an IP address, a server name, a network user name, a network service, a network name and a security rule.

3. The method of claim 1, wherein said description is selected from a group consisting of a synonym, a genus and an indication that said at least one object is unknown.

4. The method of claim 1, wherein said at least one operation is selected from a group consisting of defining said at least one object as a new object, finding at least one other object that is similar to said at least one object, checking a current security policy that is applied to said at least one object, adding said at least one object to an existing network security rule, creating a new security rule for said at least one object and modifying said at least one object.

5. The method of claim 1, wherein said menu is displayed as a drop-down menu in association with said portion of said display of said natural-language request.

6. The method of claim 1, further comprising the step of
    (f) receiving, by said computer system, a user selection of one of said at least one operation.

7. The method of claim 6, further comprising the step of:
    (g) effecting said selected operation, by said computer system.

8. A method of network security administration, comprising the steps of:
    (a) receiving, by a computer system, a bit string that encodes a natural-language request for adjusting a security policy of a computer network;
    (b) parsing, by said computer system, said bit string to identify:
        (i) at least one object, and
        (ii) an action to be applied to said at least one object;
    (c) said computer system, in response to said identifying of said at least one object, displaying a description of one of said at least one object:
    (d) displaying said natural-language request, by said computer system;
    and wherein said description is displayed in association with a portion of said display of said natural-language request that includes a natural-language representation of said at least one object; and
    (e) displaying, by said computer system, said natural-language request;
        and wherein a menu is displayed in association with a portion of said display of said natural-language request that includes a natural-language representation of said at least one object.

9. A non-transient computer-readable storage medium having computer-readable code embodied on the computer-readable storage medium, the computer-readable code for adjusting a security policy of a computer network, the computer-readable code comprising:
    (a) program code for parsing a bit string that encodes a natural-language request for adjusting the security policy, to identify:

(i) at least one object, and
(ii) an action to be applied to said at least one object;
(b) program code for displaying said natural-language request;
(c) program code for, in response to said identifying of said at least one object, displaying a respective description of each of said at least one object;
(d) program code, for each of said at least one object, displaying a respective menu of at least one operation that is applicable to said each object; and
(e) program code for displaying said natural-language request; and wherein said menu is displayed in association with a portion of said display of said natural-language request that includes a natural-language representation of each of said at least one object.

10. The computer-readable storage medium of claim 9, wherein said program code for displaying said natural-language request is program code of a graphical user interface.

11. The computer-readable storage medium of claim 9, wherein said program code for displaying said at least one respective description is program code of a graphical user interface.

12. The computer-readable storage medium of claim 9, wherein said program code for displaying said at least one menu is program code of a graphical user interface.

13. A non-transient computer-readable storage medium having computer-readable code embodied on the computer-readable storage medium, the computer-readable code for adjusting a security policy of a computer network, the computer-readable code comprising:
(a) program code for parsing a bit string that encodes a natural-language request for adjusting the security policy, to identify:
(i) at least one object, and
(ii) an action to be applied to said at least one object;
(b) program code for displaying said natural-language request;
(c) program code for, in response to said identifying of said at least one object, displaying a respective description of each of said at least one object;
(d) program code, for each of said at least one object, receiving a user selection of one of at least one operation of a respective menu; and
(e) program code for displaying said natural-language request; and wherein said menu is displayed in association with a portion of said display of said natural-language request that includes a natural-language representation of each of said at least one object.

14. The computer-readable storage medium of claim 13, wherein said program code for receiving said at least one user selection is program code of a graphical user interface.

15. The computer-readable storage medium of claim 13, wherein the computer-readable code further comprises:
(f) program code for effecting said at least one selected operation.

16. A system for network security administration, comprising:
(a) a non-volatile memory wherein is stored:
(i) program code for parsing a bit string that encodes a natural-language request for adjusting a security policy of a computer network, to identify:
(A) at least one object, and
(B) an action to be applied to said at least one object,
(ii) program code for displaying said natural-language request, and
(iii) program code for, in response to said identifying of said at least one object, displaying a respective description of each of said at least one object;
(iii) program code, for each of said at least one object, receiving a user selection of one of at least one operation of a respective menu; and
(iv) program code for displaying said natural-language request; and
wherein said menu is displayed in association with a portion of said display of said natural-language request that includes a natural-language representation of each of said at least one object; and,
(b) a processor for executing said program code.

\* \* \* \* \*